Figure 1:
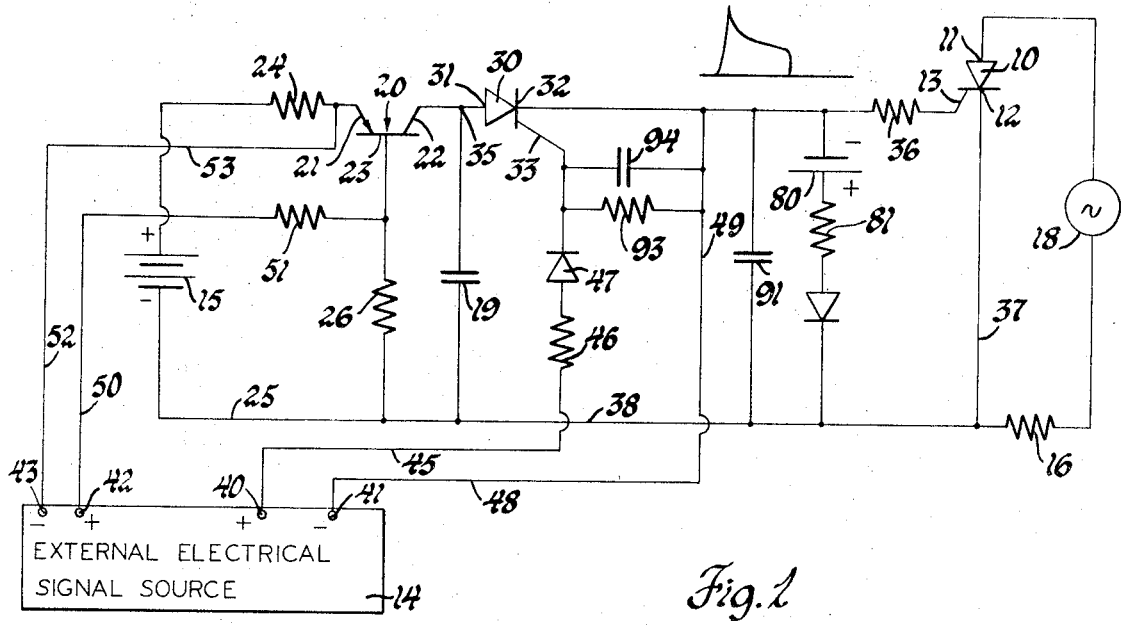

United States Patent

[11] 3,575,615

| [72] | Inventor | Elgin J. Karklins<br>Kettering, Ohio |
|---|---|---|
| [21] | Appl. No. | 863,190 |
| [22] | Filed | Oct. 2, 1969 |
| [45] | Patented | Apr. 20, 1971 |
| [73] | Assignee | General Motors Corporation<br>Detroit, Mich. |

[54] FAST RISE ELECTRIC TRIGGER PULSE CIRCUIT
2 Claims, 2 Drawing Figs.

[52] U.S. Cl.................................................. 307/252,
307/106, 307/284
[51] Int. Cl................................................ H03k 3/00,
H03k 17/00
[50] Field of Search......................................... 317/148.5
(B); 307/252.53, 252.55, 252.70, 284, 106,
(Inquired); 328/(Inquired)

[56] References Cited
UNITED STATES PATENTS

| 3,315,101 | 4/1967 | Smith | 307/284X |
| 3,320,440 | 5/1967 | Reed | 317/148.5<br>(B)(X) |
| 3,321,641 | 5/1967 | Howell | 317/148.5<br>(B)(UX) |
| 3,417,297 | 12/1968 | Wallentowitz | 317/148.5<br>(B)(UX) |
| 3,483,395 | 12/1969 | Sauber | 317/148.5<br>(B)(UX) |

Primary Examiner—Robert K. Schaeffer
Assistant Examiner—William J. Smith
Attorneys—Eugene W. Christen, Creighton R. Meland and Richard G. Stahr ABSTRACT: A fast rise electric trigger pulse circuit for producing a fast rise electric pulse for triggering a silicon controlled rectifier into an electrical load. A capacitor is connected across a source of direct current potential through the emitter-collector electrodes of a normally conducting transistor and across the gate-cathode electrodes of the power silicon controlled rectifier through the anode-cathode electrodes of a switching silicon controlled rectifier. A first externally generated electric signal triggers the switching silicon controlled rectifier conductive through the anode-cathode electrodes thereof to complete a discharge circuit for the capacitor through the gate-cathode electrodes of the power silicon controlled rectifier to trigger this device conductive through the anode-cathode electrodes thereof. A second later, externally generated electric signal extinguishes the transistor for the duration thereof to interrupt the anode-cathode circuit of the switching silicon controlled rectifier thereby extinguishing this device and resetting the circuit for the next externally generated electric signal.

PATENTED APR 20 1971     3,575,615

INVENTOR.
Elgin J. Karklins
BY
Richard G. Stahr
ATTORNEY

FAST RISE ELECTRIC TRIGGER PULSE CIRCUIT

The present invention relates to a circuit for producing a fast rise electric trigger pulse for triggering a silicon controlled rectifier into an electrical load.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered to conduction through the anode-cathode electrodes upon the application, across the control-cathode electrodes, of a control signal of a polarity which is positive at the control electrode with respect to the cathode electrode and of sufficient magnitude to produce control-cathode electrode, or gate, current.

Initially, current flow through the silicon controlled rectifier is concentrated within a small area which expands with time until current flows across substantially the entire conductive area of the device. Therefore, when a silicon controlled rectifier is switched into loads which permit an extremely rapid rise of load current, the silicon controlled rectifier may break down because of the excessive current flow through the initially small conductive area, thereby destroying the device. This is particularly true of power silicon controlled rectifiers employed to switch considerable in-rush or initial current which are triggered to conduction by weak control signal pulses. One method of preventing the destruction of a power silicon controlled rectifier switching into electrical loads of this type is to provide a control signal in the form of a pulse which rapidly rises to a level of sufficient magnitude to rapidly expand the area of conduction to a degree sufficient to safely carry the load current.

For a silicon controlled rectifier to remain conductive after an electrical control signal applied across the gate-cathode electrodes thereof in the proper polarity relationship is removed, it is necessary that the anode-cathode current flow through the device be of sufficient magnitude to maintain conduction therethrough. The current magnitude required to maintain the device conductive is commonly called the "hold-in" current and is dependent upon the characteristic of the device. Therefore, when a silicon controlled rectifier is switched into loads which permit only a slow rise of load current through the anode-cathode electrodes, the device may not remain conductive upon the removal of the control signal should the control signal be of insufficient duration to permit the buildup of load current through the anode-cathode electrodes to reach a magnitude which will maintain the device conductive.

It is, therefore, an object of this invention to provide an improved fast rise electric trigger pulse circuit for triggering a silicon controlled rectifier into any type electrical load.

In accordance with this invention, a circuit for producing fast rise electric trigger pulses for triggering a power silicon controlled rectifier into any type electrical load is provided wherein a capacitor, charged through the current carrying electrodes of a transistor from a source to direct current potential, is discharged through the gate-cathode electrodes of a power silicon controlled rectifier through the anode-cathode electrodes of a switching silicon controlled rectifier which is triggered conductive by an externally generated electric signal and is later extinguished upon the interruption of its anode-cathode energizing circuit from the source of direct current potential by the transistor which is extinguished by a second later externally generated electric signal.

Figure 2:
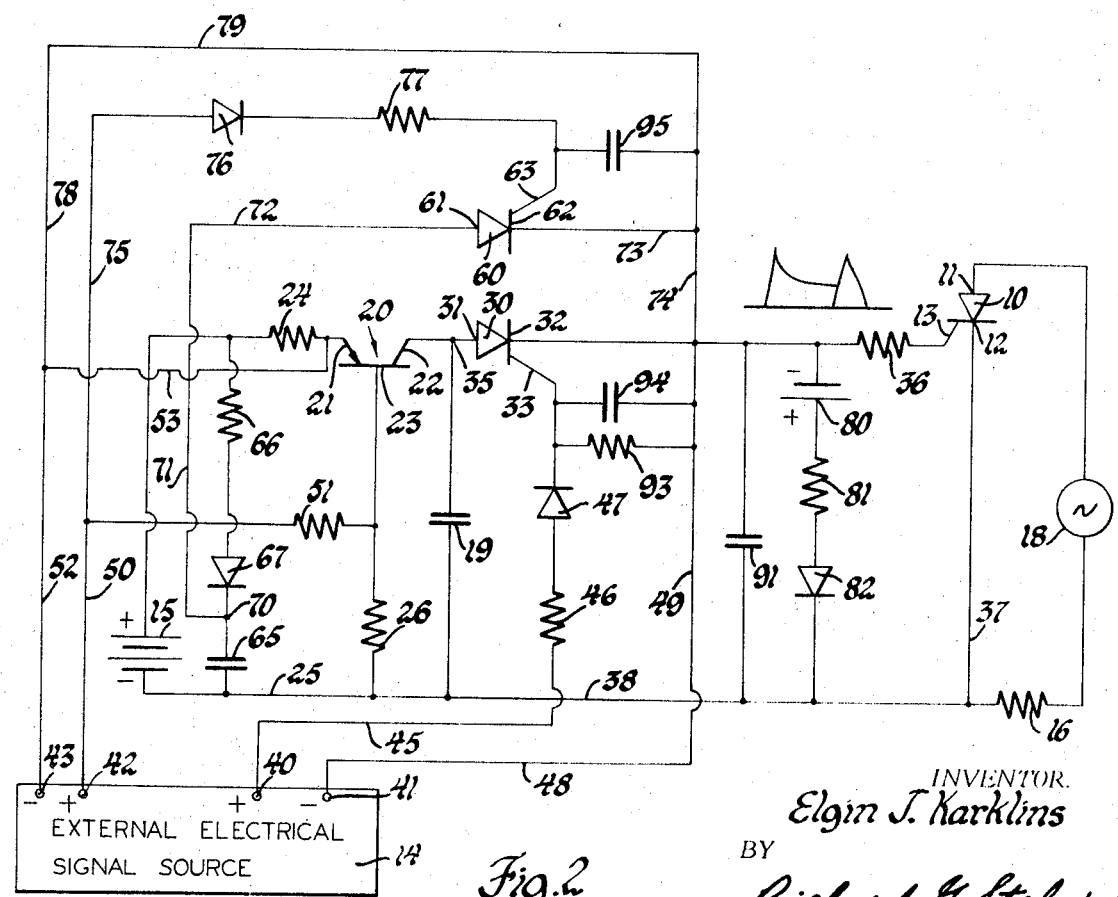

For a better understanding of the present invention, together with additional objects, advantages and features thereof, reference is made to the following description and accompanying drawings, in which:

FIG. 1 is a schematic diagram of one embodiment of the fast rise electric trigger pulse circuit of this invention; and FIG. 2 is a schematic diagram of another embodiment of the fast rise electric trigger pulse circuit of this invention.

Referring to the FIGS. of the drawings wherein like elements have been given like characters of reference, the novel fast rise electric trigger pulse circuit of this invention is set forth in schematic form in combination with a power silicon controlled rectifier 10, having an anode electrode 11, a cathode electrode 12 and a gate electrode 13, a source of externally generated electric signals 14 of the type which produces first and second electric signals separated by a predetermined timed interval which, since it may be any one of several signal sources of this type well known in the art, has been indicated in block form and a source of direct current potential which may be a conventional storage battery 15.

The anode electrode 11 and cathode electrode 12 of power silicon controlled rectifier 10 are shown in the FIGS. to be connected in series with an electrical load, indicated as a resistor 16 but which may be any type electrical load, across a source of alternating current potential 18 which, since it may be any conventional alternating current potential source and forms no part of this invention, has been symbolically illustrated.

Briefly, the novel fast rise rise trigger pulse circuit of this invention comprises a capacitor 19, a first electric switching device having normally closed current carrying elements electrically operable to an open condition which may be a type PNP transistor 20 having emitter 21, collector 22 and control or base 23 electrodes, circuitry for connecting capacitor 19 and the current carrying elements of the first electric switching device in series across the source of direct current potential, battery 15, a second electric switching device having normally open current carrying elements electrically operable to a closed condition which may be a switching silicon controlled rectifier 30 having anode 31, cathode 32 and control or gate 33 electrodes, circuitry for connecting the current carrying elements of the second electric switching device and the gate-cathode electrodes of power silicon controlled rectifier 10 in series across capacitor 19, circuitry for applying a first externally generated electric signal to the second electric switching device for operating the current carrying elements thereof to the closed condition to complete a discharge circuit for capacitor 19 through the gate-cathode electrodes of power silicon controlled rectifier 10 and circuitry for applying a second later externally generated electric signal to the first electric switching device for operating the current carrying elements thereof to the open condition for the duration of the second electric signal.

Capacitor 19 and the current carrying elements of the first electric switching device, emitter electrode 21 and collector electrode 22 of the type PNP transistor 20, are connected in series across the source of direct current potential through a circuit which may be traced from the positive polarity terminal of battery 15 through resistor 24, the emitter-collector electrodes of type PNP transistor 20, capacitor 19 and lead 25 to the negative polarity terminal of battery 15. Battery 15, therefor, is applied across the emitter-collector electrodes of transistor 20 in the proper polarity relationship for emitter-collector current flow through a type PNP transistor.

The base or control electrode 23 of type PNP transistor 20 is connected to the negative polarity terminal of battery 15 through a current limiting resistor 26 and lead 25 and the emitter electrode thereof is connected to the positive polarity terminal of battery 15 through resistor 24. Battery 15, therefore, is applied across the emitter-base electrodes of type PNP transistor 20 in the proper polarity relationship to produce emitter-base current flow through a type PNP transistor, consequently, transistor 20 is normally conductive through the current carrying elements thereof, emitter electrode 21 and collector electrode 22. Consequently, the current carrying elements of this first electric switching device are normally closed.

The current carrying elements of the second electric switching device, the anode-cathode electrodes of switching silicon controlled rectifier 30, and the gate-cathode electrodes of power silicon controlled rectifier 10 are connected in series across capacitor 19 through a circuit which may be traced from the plate of capacitor 19 connected to junction 35 between capacitor 19 and the anode electrode 31 of switching silicon controlled rectifier 30, through the anode-cathode electrodes of switching silicon controlled rectifier 30, resistor 36, the gate-cathode electrodes of power silicon controlled rectifier 10, lead 37 and lead 38 to the opposite plate of capacitor 19.

The source of externally generated electric signals 14 may be of the type which produces a first electric signal across output terminals 40 and 41 thereof of a positive polarity upon output terminal 40 with respect to output terminal 41 and a second later electric signal, separated from the first electric signal by a predetermined timed interval, across terminals 42 and 43 of a positive polarity upon output terminal 42 with respect to output terminal 43, as indicated in the FIGS. As the source of externally generated electric signals 14 may be any one of several well known in the art and, per se, forms no part of this invention, it is indicated in block form in the FIGS. in the interest of reducing drawing complexity.

The first externally generated electric signals appearing across output terminals 40 and 41 of source 14 are applied to the second electric switching device for operating the current carrying elements thereof to the closed condition to complete a discharge circuit for capacitor 19 through the gate-cathode electrodes of power silicon controlled rectifier 10. The electric signals appearing across output terminals 40 and 41 of external signal source 14 are applied across the gate-cathode electrodes of switching silicon controlled rectifier 30, through lead 45, current limiting resistor 46 and diode 47 and through leads 48 and 49, respectively. As the first electric signals generated by source 14 are of a positive polarity upon output terminal 40, connected to the gate electrode 33 of switching silicon controlled rectifier 30, with respect to output terminal 41, connected to the cathode electrode 32 of switching silicon controlled rectifier 30, these signals are applied across the gate-cathode electrodes of switching silicon controlled rectifier 30 in the proper polarity relationship to produce gate and, consequently, anode-cathode current flow therethrough. Consequently, these electric signals operate the current carrying elements of the second electrical switching device to the closed condition.

The second later externally generated electric signals appearing across output terminals 42 and 43 of source 14 are applied to the first electric switching device for operating the current carrying elements thereof to the open condition for the duration of the signal. The electric signals appearing across output terminals 42 and 43 of external signal source 14 are applied across the base electrode 23 of transistor 20 and a selected one of the current carrying electrodes thereof, emitter electrode 21 of this type PNP transistor, through lead 50 and current limiting resistor 51 and through leads 52 and 53, respectively. As the second later electric signals generated by source 14 are of a positive polarity upon output terminal 42, connected to the base electrode 23 of type PNP transistor 20, with respect to output terminal 43, connected to the emitter electrode 21 of type PNP transistor 20, these signals are applied across the emitter-base electrodes of type PNP transistor 20 in a polarity relationship which will extinguish emitter-base and, consequently, emitter-collector current flow through the type PNP transistor. Consequently, these second electric signals operate the current carrying elements of the first electrical switching device to the open condition.

With type PNP transistor 20 normally conducting, for the reasons hereinabove set forth, capacitor 19 becomes charged substantially to the full potential of battery 15 with the plate connected to junction 35 being of a positive polarity with respect to the other plate. Consequently, the charge upon capacitor 19 is applied across the anode-cathode electrodes of switching silicon controlled rectifier 30 in the proper polarity relationship to produce anode-cathode current flow through a silicon controlled rectifier. That is, the positive polarity plate of capacitor 19 is connected to the anode electrode 31 at junction 35 and the other plate is connected to the cathode electrode 32 through leads 38 and 37, the gate-cathode junction of power silicon controlled rectifier 10 and resistor 36.

Upon the occurrence of a first externally generated electric signal across output terminals 40 and 41 of source 14, applied across the gate-cathode electrodes of switching silicon controlled rectifier 30, through circuitry previously described, in the proper polarity relationship to produce gate-cathode and, consequently, anode-cathode current flow through a silicon controlled rectifier, switching silicon controlled rectifier 30 goes conductive through the anode-cathode electrodes thereof. Conducting silicon controlled rectifier 30 completes a discharge circuit, previously described, for capacitor 19 through the anode-cathode electrodes thereof and the gate-cathode electrodes of power silicon controlled rectifier 10. Discharging capacitor 19 and conducting transistor 20 provides a potential signal of a waveform as shown in FIG. 1 which produces gate-cathode current flow through power silicon controlled rectifier 10, a condition which results in anode-cathode current flow therethrough while the potential upon anode electrode 11 is of a positive polarity with respect to cathode electrode 12 to complete a circuit from alternating current potential source 18 through load 16. Upon the initiation of conduction through the anode-cathode electrodes of switching silicon controlled rectifier 30, the initial discharge of capacitor 19 produces the initial fast rise spike of the trigger signal waveform. The signal produces by discharging capacitor 19 begins to fall rapidly, however, conducting transistor 20 maintains the magnitude of the signal substantially constant over the remainder of the signal as shown in the FIG. The initial fast rise spike produced by capacitor 19 is of sufficient magnitude to rapidly expand the area of conduction of power silicon controlled rectifier 10 to a degree sufficient to carry the load current and the substantially constant magnitude portion is of sufficient duration to permit the load current through the anode-cathode electrodes of power silicon controlled rectifier 10 to reach a sufficient magnitude to maintain power silicon controlled rectifier 10 conductive after the removal of the control signal.

Upon the occurrence of a second later externally generated electric signal across output terminals 42 and 43 of source 14, applied across the emitter-base electrodes of type PNP transistor 20, through circuitry previously described, in an inverse polarity relationship which interrupts emitter-base current flow through a conducting type PNP transistor, transistor 20 goes nonconductive through the emitter-collector electrodes thereof to rapidly reduce the magnitude of the trigger signal to zero to interrupt the trigger signal and to interrupt the anode-cathode circuit for switching silicon controlled rectifier 30 from battery 15. Consequently, switching silicon controlled rectifier 30 extinguishes.

At the conclusion of the second later externally generated electric signal, normally conducting type PNP transistor again conducts through the emitter-collector electrodes thereof to complete the charging circuit for capacitor 19, thereby resetting the circuit for the appearance of the next first externally generated electric signal to be applied across the gate-cathode electrodes of switching silicon controlled rectifier 30.

Referring to FIG. 2, another embodiment of the circuit of the present invention is set forth in schematic form. As a portion of the circuit of FIG. 2 is identical to a portion of the circuit of FIG. 1, like elements have been given like characters of reference.

With the embodiment of FIG. 2, a third electric switching device which may be a second switching silicon controlled rectifier 60 having anode 61, cathode 62 and gate 63 electrodes and a second capacitor 65 have been added.

The second capacitor 65 is connected across the source of direct current potential 15 through a circuit which may be traced from the positive polarity terminal of battery 15, through current limiting resistor 66, diode 67, capacitor 65 and lead 25 to the negative polarity terminal of battery 15.

The current carrying elements of the third electric switching device, the anode-cathode electrodes of second switching silicon controlled rectifier 60, and the gate-cathode electrodes of power silicon controlled rectifier 10 are connected in series across the second capacitor 65 through a circuit which may be traced from the plate of second capacitor 65 connected to junction 70 through leads 71 and 72, the anode-cathode electrodes of silicon controlled rectifier 60, leads 73 and 74, resistor 36, the gate-cathode electrodes of power silicon controlled rectifier 10 and leads 37, 38 and 25 to the other plate of capacitor 65.

The second later externally generated electric signal produced by source 14 is also applied across the gate-cathode electrodes of switching silicon controlled rectifier 60 through lead 75, diode 76 and current limiting resistor 77 and through leads 78 and 79, respectively.

In the second embodiment, both capacitors 19 and 65 initially become charged substantially to the full potential of battery 15 with the plates thereof connected to respective junctions 35 and 70 being of a positive polarity with respect to the other plates.

With the first externally generated electric signal, capacitor 19 discharges through the gate-cathode electrodes of power silicon controlled rectifier 10 as previously described in regard to FIG. 1. Consequently, the charge upon capacitor 65 is applied across the anode-cathode electrodes of the second switching silicon controlled rectifier 60 in the proper polarity relationship to produce anode-cathode current flow through a silicon controlled rectifier. That is, the positive polarity plate of capacitor 65 is connected to the anode electrode 61 through leads 71 and 72 and the other plate is connected to the cathode electrode 62 through leads 25, 38 and 37, the gate-cathode junction of power silicon controlled rectifier 10, resistor 36 and leads 74 and 73.

The second later externally generated electric signal, in addition to extinguishing transistor 20 as previously described, is also applied across the gate-cathode electrodes of a switching silicon controlled rectifier 60 in a polarity relationship to produce gate, consequently, anode-cathode electrode, current flow therethrough to complete a discharge circuit for capacitor 65 through the gate-cathode electrodes of power silicon controlled rectifier 10 through a circuit previously described.

The combination of discharging capacitor 19, conducting transistor 20, and discharging capacitor 65 provides a potential waveform as shown in FIG. 2. Discharging capacitor 19 provides the initial fast rise spike, conducting transistor 20 maintains the trigger signal at a substantially constant value for a predetermined period of time and discharging capacitor 65 provides the second fast rise spike of this waveform. A trigger signal pulse of this waveform provides two separate sharply increasing pulses of gate-cathode current flow through power silicon controlled rectifier 10, a condition which will provide anode-cathode current flow through power silicon controlled rectifier 10 into more highly inductive loads than will the trigger signal produced by the circuit of FIG. 1.

After capacitor 65 has discharged, there is an insufficient current flow from battery 15 through resistor 66 and the anode-cathode electrodes of silicon controlled rectifier 60 to maintain this device conductive, consequently, silicon controlled rectifier 60 extinguishes.

Capacitor 65 begins to charge when silicon controlled rectifier extinguishes and at the conclusion of the second later externally generated electric signal, transistor 20 again conducts to charge capacitor 19. Consequently, the circuit is reset for the occurrence of the next first externally generated electric signal.

Resistor 24, connected in series with the emitter electrode 21 of switching transistor 20 determines the magnitude of the substantially constant portion of the trigger signal waveform of both FIGS. 1 and 2. Resistor 36, connected in series with the gate electrode 13 of power silicon controlled rectifier 10, may be a variable resistor and is provided for the purpose of matching the gate-cathode impedance of the silicon controlled rectifier selected as power silicon controlled rectifier 10 to the circuit of this invention. Capacitor 19 is inserted for the purpose of improving the wave-shape of the trigger signals produced by the circuit of this invention. The parallel combination of resistor 93 and capacitor 94 of FIGS. 1 and 2 and capacitor 95 of FIG. 2 are inserted for the purpose of noise suppression.

While specific electric elements for the three electric switching devices, specific electric polarity relationships and a single external electric signal source which produces two separated electric signals have been set forth in this specification, it is to be specifically understood that other electric switching elements having similar electric characteristics and compatible electric polarity relationships may be substituted for transistor 20 and silicon controlled rectifiers 30 and 60 and two separate external electric signal sources may be provided without departing from the spirit of the invention.

To prevent transient pulses in the system from inadvertently triggering power silicon controlled rectifier 10 conductive, a small direct current bias may be applied across the gate-cathode electrodes thereof in an inverse polarity relationship. Battery 80 having the negative polarity terminal thereof connected to the gate electrode 13 of power silicon controlled rectifier 10 through resistor 36 and the positive polarity terminal thereof connected to the cathode electrode 12 of power silicon controlled rectifier 10 through resistor 81 which determines the magnitude of negative bias applied to silicon controlled rectifier 10, isolating diode 82, leads 38 and 37 is selected to be of a potential magnitude which will permit power silicon controlled rectifier 10 to be triggered conductive only by an electrical pulse of a magnitude substantially the same as that provided by the novel circuit of this invention.

I claim:

1. A fast rise electric trigger pulse circuit for producing a fast rise electric pulse which will trigger a silicon controlled rectifier into an electrical load comprising in combination with a power silicon controlled rectifier having anode, cathode and gate electrodes and a source of direct current potential, a first capacitor, a first electric switching device having normally closed current carrying elements electrically operable to an open condition, means for connecting said first capacitor and said current carrying elements of said first electric switching device in series across said source of direct current potential, a second electric switching device having normally open current carrying elements electrically operable to a closed condition, means for connecting said current carrying elements of said second electric switching device and said gate-cathode electrodes of said power silicon controlled rectifier in series across said capacitor, a second capacitor, means for connecting said second capacitor across said source of direct current potential, a third electric switching device having normally open current carrying elements electrically operable to a closed condition, means for connecting said current carrying elements of said third electric switching device and said gate-cathode electrodes of said power silicon controlled rectifier in series across said second capacitor, means for applying a first externally generated electric signal to said second electric switching device for operating said current carrying elements thereof to said closed condition to complete a discharge circuit for said first capacitor through said gate-cathode electrodes of said power silicon controlled rectifier, and means for applying a second, later externally generated electric signal to said first electric switching device for operating said current carrying elements thereof to said open condition for the duration of said second electric signal and to said third electric switching device for operating said current carrying elements thereof to said closed condition to complete a discharge circuit for said second capacitor through said gate-cathode electrodes of said power silicon controlled rectifier.

2. A fast rise electric trigger pulse circuit for producing a fast rise electric pulse which will trigger a silicon controlled rectifier into an electrical load comprising in combination with a power silicon controlled rectifier having anode, cathode and gate electrodes and a source of direct current potential, a first capacitor, a transistor having two current carrying electrodes and a control electrode biased normally conductive, means for connecting said first capacitor and said current carrying electrodes of said transistor in series across said source of direct current potential, a first switching silicon controlled rectifier having anode, cathode and gate electrodes, means for connecting said anode-cathode electrodes of said first switching silicon controlled rectifier and said gate-cathode electrodes of said power silicon controlled rectifier in series across said capacitor, a second capacitor, means for connecting said second capacitor across said source of direct current potential, a second switching silicon controlled rectifier having anode, cathode and gate electrodes, means for connecting said anode-cathode electrodes of said second switching silicon controlled rectifier and said gate-cathode electrodes of said power silicon controlled rectifier in series across said second capacitor, means for applying a first externally generated electric signal across said gate-cathode electrodes of said first switching silicon controlled rectifier in a polarity relationship to produce anode-cathode current flow therethrough to complete a discharge circuit for said capacitor through said gate-cathode electrodes of said power silicon controlled rectifier, and means for applying a second later externally generated electric signal across said control electrode and a selected one of said current carrying electrodes of said transistor in a polarity relationship to extinguish said transistor for the duration of said second electric signal and across said gate-cathode electrodes of said second switching silicon controlled rectifier in a polarity relationship to produce gate and anode-cathode current flow therethrough to complete a discharge circuit for said second capacitor through said gate-cathode electrodes of said power silicon controlled rectifier.